US012798800B2

(12) United States Patent
Reese et al.

(10) Patent No.: US 12,798,800 B2
(45) Date of Patent: Nov. 17, 2026

(54) PLATFORM-PAYLOAD INTERFACE SYSTEMS AND METHODS

(71) Applicant: Teledyne FLIR Defense, Inc., Thousand Oaks, CA (US)

(72) Inventors: Brandon Reese, Thorntown, IN (US); Brent Rardin, Lafayette, IN (US); Kerry O'Donnell, Whitestown, IN (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 0 days.

(21) Appl. No.: 19/006,792

(22) Filed: Dec. 31, 2024

(65) Prior Publication Data

US 2025/0223037 A1 Jul. 10, 2025

Related U.S. Application Data

(60) Provisional application No. 63/618,257, filed on Jan. 5, 2024.

(51) Int. Cl.
*B64U 20/87* (2023.01)
*B64U 20/80* (2023.01)
*B64U 101/30* (2023.01)

(52) U.S. Cl.
CPC ............ *B64U 20/87* (2023.01); *B64U 20/80* (2023.01); *B64U 2101/30* (2023.01)

(58) Field of Classification Search
CPC .................................................. H01R 13/623
See application file for complete search history.

(56) References Cited

U.S. PATENT DOCUMENTS

| | | | | |
|---|---|---|---|---|
| 9,280,038 | B1 * | 3/2016 | Pan | B64U 20/87 |
| 9,577,392 | B2 | 2/2017 | Chang | |
| 9,715,472 | B2 | 7/2017 | Chang | |
| 10,315,781 | B2 * | 6/2019 | Zhao | B64U 20/87 |
| 10,807,710 | B2 * | 10/2020 | Tian | H01R 13/6276 |
| 11,794,930 | B1 * | 10/2023 | McGann | B64U 30/20 |

OTHER PUBLICATIONS

Rogers, Andrew, "Introduction to USB Type-C," (Application Note AN1953), Microchip Technology Inc., Jan. 30, 2015, 18 pages, Chandler/USA.

USB Implementers Forum (USB-IF) Device Working Group "Universal Serial Bus Type-C Locking Connector Specification", Revision 1.0, Mar. 9, 2016, 13 pages, USB Implementers Forum, Portland/USA.

* cited by examiner

*Primary Examiner* — Richard Green
(74) *Attorney, Agent, or Firm* — Haynes and Boone, LLP

(57) ABSTRACT

A system includes a platform interface having a base configured to be secured to a platform or integrated with the platform. The base is configured to rotatably engage with a support of a payload interface to secure the payload interface to the platform interface, the support being configured to be secured to a payload. A first electrical connector of the platform interface is configured to engage with a second electrical connector affixed to the support, and to rotate with the second electrical connector relative to the base as the support is rotated to engage the base. Other features, systems, and methods are also provided.

20 Claims, 12 Drawing Sheets

PLATFORM-PAYLOAD INTERFACE SYSTEMS AND METHODS

CROSS REFERENCE TO RELATED APPLICATIONS

This application claims the benefit of and priority to U.S. Provisional Application No. 63/618,257 filed Jan. 5, 2024 and entitled "PLATFORM-PAYLOAD INTERFACE SYSTEMS AND METHODS," which is incorporated herein by reference in its entirety.

TECHNICAL FIELD

The present invention relates generally to connecting payloads to mobile platforms and, more specifically, to interfaces to facilitate such connections.

BACKGROUND

Modern platforms such as unmanned aerial vehicles (UAVs), unmanned ground vehicles (UGVs), fixed emplacements, and handheld platforms, are used to support a wide range of real-world applications including surveillance, reconnaissance, exploration, item transportation, disaster relief, aerial photography, large-scale agriculture monitoring, and others. In many cases, a platform may be equipped with a variety of different payload devices, such as different types of sensors and navigation devices, and may be configured to address a broad variety of operational needs. However, use of such devices has traditionally been limited as many platforms are generally configured to have specific/custom configurations (e.g., a set of specific/custom devices) that do not allow for functionality changes without significant reconfiguration of the platform by a user. Thus, there exists a need for systems and methods that provide caser reconfiguration capability and greater versatility, such as in terms of future expansion and capabilities.

SUMMARY

Some embodiments of the present disclosure include a system comprising: a platform interface comprising: a base configured to be secured to a platform or integrated with the platform, and configured to rotatably engage with a support of a payload interface to secure the payload interface to the platform interface, the support being configured to be secured to a payload; and a first electrical connector configured to engage with a second electrical connector affixed to the support, and to rotate with the second electrical connector relative to the base as the support is rotated to engage the base.

Some embodiments of the present disclosure include a method comprising: connecting a payload interface to a platform interface comprising a platform mounting interface configured to be secured to a platform, the connecting comprising: aligning the payload interface relative to the platform interface to engage a first electrical connector of the platform interface with a second electrical connector affixed to a support of the payload interface, the support being configured to be secured to the payload; and rotating the support with the first and second electrical connectors relative to the platform mounting interface to engage the support with the platform mounting interface.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
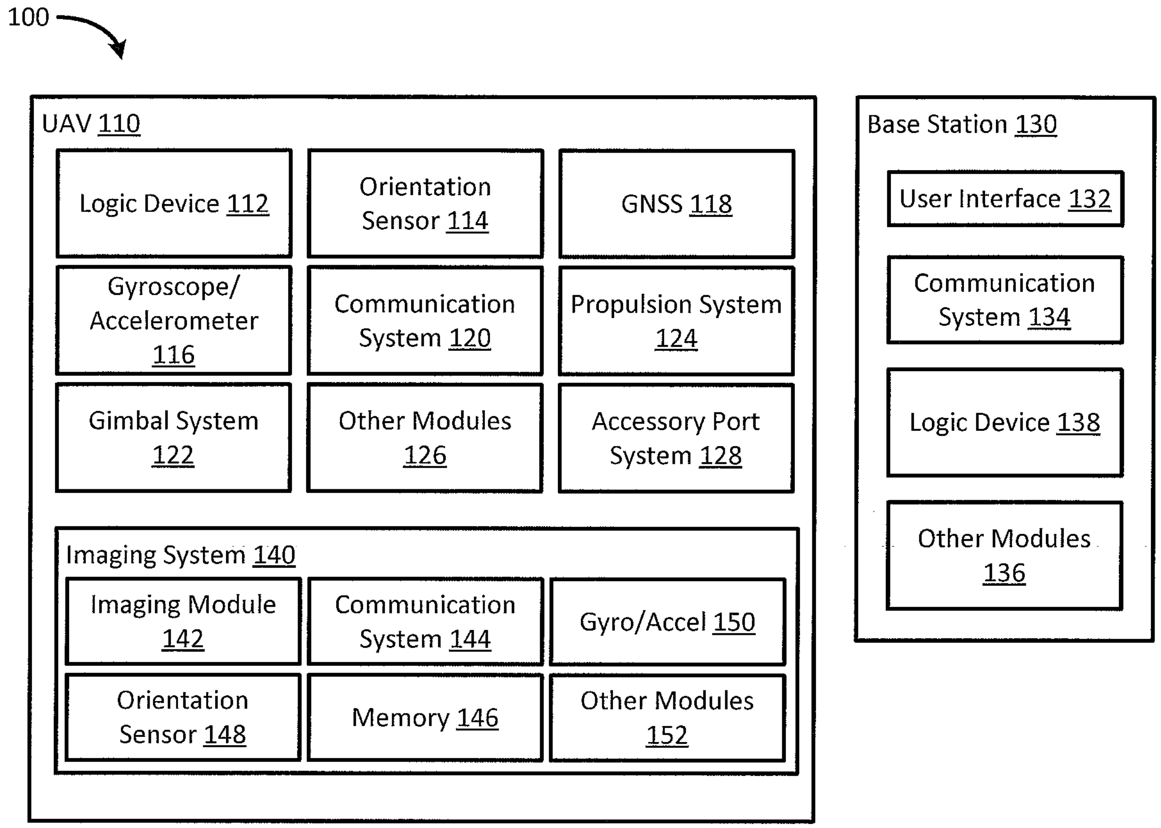
FIG. 1 is a block diagram of a survey system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

A platform-payload interface system may have a platform interface which has: a base; a platform mounting interface rigidly coupled to the base; a first electrical connector; a connector holder rotatably coupled to the platform mounting interface and supporting the first electrical connector; and a spring biasing the connector holder toward the platform mounting interface. The platform mounting interface has tabs entering respective alignment slots in a payload interface to limit an orientation of the payload interface relative to the platform interface to one or more predefined orientations in which a second electrical connector of the payload interface is aligned with the first electrical connector. The one or more tabs include recesses that receive detents of the payload interface when the first electrical connector has been connected to the second electrical connector and the first and second electrical connectors are rotated into a latched position. Other features may also be provided.

Some embodiments of the platform-payload interface system may be used in UAVs and other platforms, for example, as follows. UAVs and other platforms generally do not have ports that allow for versatile attachment of various payload devices to improve, enhance, and scale a UAV's capabilities. Existing UAV systems are configured to have specific/custom configurations (e.g., are limited to a certain set of specific/custom payload devices), which do not allow for functionality changes of the UAV system by a user. Oftentimes payload devices in existing UAV systems are limited by a main payload interface configuration and require reconfiguration of the UAV system. In accordance with various embodiments described herein, a payload device may be developed and attached to a UAV without disrupting/using a main payload interface or requiring significant reconfiguration of a UAV system. Various systems and methods related to interchangeable and field-replaceable payload device attachment interfaces (e.g., payload ports and payload port interfaces) are disclosed herein to provide greater UAV versatility, such as in terms of future expansion and capabilities for UAV systems.

For example, in an embodiment, a payload device may be connected to a payload port of a UAV. The payload port may be configured for interchangeable attachment of a plurality of payload devices to the UAV. The payload port may have a support configured to engage with the payload device and physically secure the payload device to the payload port (e.g., by using a locking member of the support). The payload port may have an electrical interface configured to electrically connect the payload device to the UAV, where the support aligns the payload device relative to the electrical interface when the payload device is connected to the payload port. The payload port may automatically provide a detection signal to the UAV indicating that the payload device has been connected to the payload port. In response to the automatic detection of the payload device, the UAV may automatically identify the payload device (e.g., by retrieving identification information from the payload device) and automatically or selectively adjust its functionality based on the identification of payload device. For example, the UAV may have different embedded functional parameter set(s) and change/adjust its functional parameters based on the identity of the payload device that has been attached to the UAV. In some embodiments, different/new functional parameter set(s) could be introduced to the UAV by attaching an payload device to the UAV. For example, functional parameter set(s) may be downloaded from the payload device upon detection and identification of the payload device, and the downloaded functional parameter set(s) may be integrated into an operation of the UAV. In various embodiments, a user may be able to control which functional parameter set(s) are integrated into an operation of the UAV through a base station user interface. For example, the UAV may send the detection and identification information to the base station and in turn may receive instructions, selected by the user, for integrating certain functional parameters into the operation of the UAV. Further embodiments and details are described below in reference to the accompanying figures of the disclosure.

FIG. 1 illustrates a block diagram of a system 100 in accordance with one or more embodiments of the present disclosure. System 100 is a survey system including a UAV platform 110, but other types of systems or platforms are possible. In various embodiments, the survey system 100 and/or elements of the survey system 100 may be configured to fly over a scene or survey area, to fly through a structure, or to approach a target and image or sense the scene, structure, or target, or portions thereof, using a gimbal system 122 to aim a sensor payload 140 (e.g., an imaging system) at the scene, structure, or target, or portions thereof, for example. Resulting imagery and/or other sensor data may be processed (e.g., by the sensor payload 140, UAV 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the survey system 100 may be configured to use such imagery and/or sensor data to control operation of the UAV 110 and/or the sensor payload 140, as described herein, such as controlling the gimbal system 122 to aim the sensor payload 140 towards a particular direction, and/or controlling a propulsion system 124 to move the UAV 110 to a desired position in a scene or structure or relative to a target.

In the embodiment shown in FIG. 1, the survey system 100 includes the UAV 110, base station 130, and at least one sensor payload 140. The UAV 110 may be implemented as a UAV configured to move or fly and position and/or aim the sensor payload 140 (e.g., relative to a designated or detected target). As shown in FIG. 1, the UAV 110 may include one or more of a logic device 112, an orientation sensor 114, a gyroscope/accelerometer 116, a global navigation satellite system (GNSS) 118, a communication system 120, a gimbal system 122, a propulsion system 124, and other modules 126. Operation of the UAV 110 may be substantially autonomous and/or partially or completely controlled by the base station 130, which may include one or more of a user interface 132, a communication system 134, a logic device 138, and other modules 136. In other embodiments, the UAV 110 may include one or more of the elements of the base station 130, such as with various types of manned aircraft, terrestrial vehicles, and/or surface or subsurface watercraft. The sensor payload 140 may be physically coupled to the UAV 110 and be configured to capture sensor data (e.g., visible spectrum images, infrared images, narrow aperture radar data, and/or other sensor data) of a target position, area, and/or object(s) as selected and/or framed by operation of the UAV 110 and/or the base station 130. In some embodiments, one or more of the elements of the survey system 100 may be implemented in a combined housing or structure that can be coupled to or within the UAV 110 and/or held or carried by a user of the survey system 100.

The logic device 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the UAV 110 and/or other elements of the survey system 100, such as the gimbal system 122, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the survey system 100).

In addition, a non-transitory medium may be provided for storing machine readable instructions for loading into and execution by the logic device 112. In these and other embodiments, the logic device 112 may be implemented with other components where appropriate, such as volatile memory, non-volatile memory, one or more interfaces, and/or various analog and/or digital components for interfacing with devices of the survey system 100. For example, the logic device 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the logic device 112 may be integrated with one or more other elements of the UAV 110, for example, or distributed as multiple logic devices within the UAV 110, base station 130, and/or sensor payload 140.

In some embodiments, the logic device 112 may be configured to substantially continuously monitor and/or store the status of and/or sensor data provided by one or more elements of the UAV 110, sensor payload 140, and/or base station 130, such as the position and/or orientation of the UAV 110, sensor payload 140, and/or base station 130, for example. In various embodiments, sensor data may be monitored and/or stored by the logic device 112 and/or processed or transmitted between elements of the survey system 100 substantially continuously throughout operation of the survey system 100, where such data includes various types of sensor data, control parameters, and/or other data (e.g., for payload device detection).

The orientation sensor 114 may be implemented as one or more of a compass, float, accelerometer, and/or other device capable of measuring an orientation of the UAV 110 (e.g., magnitude and direction of roll, pitch, and/or yaw, relative to one or more reference orientations such as gravity and/or Magnetic North), gimbal system 122, sensor payload 140, and/or other elements of system 100, and providing such measurements as sensor signals and/or data that may be communicated to various devices of the survey system 100. In some cases, a yaw and/or position of the UAV 110 may be adjusted to better position/orient the UAV 110. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the UAV 110 and/or other elements of the survey system 100 and providing such measurements as sensor signals and/or data that may be communicated to other devices of the survey system 100 (e.g., user interface 132, logic device 112, logic device 138). The GNSS 118 may be implemented according to any global navigation satellite system, including a GPS, GLONASS, and/or Galileo based receiver and/or other device capable of determining absolute and/or relative position of the UAV 110 (e.g., or an element of the UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the survey system 100. In some embodiments, the GNSS 118 may include an altimeter, for example, or may be used to provide an absolute altitude.

The communication system 120 may be implemented as any wired and/or wireless communications module configured to transmit and receive analog and/or digital signals between elements of the survey system 100. For example, the communication system 120 may be configured to receive flight control signals and/or data from the base station 130 and provide them to the logic device 112 and/or propulsion system 124. In other embodiments, the communication system 120 may be configured to receive images and/or other sensor information (e.g., visible spectrum and/or infrared still images or video images) from the sensor payload 140 and relay the sensor data to the logic device 112 and/or base station 130. In some embodiments, the communication system 120 may be configured to support spread spectrum transmissions, for example, and/or multiple simultaneous communications channels between elements of the survey system 100. Wireless communication links may include one or more analog and/or digital radio communication links, such as WiFi and others, as described herein, and may be direct communication links established between elements of the survey system 100, for example, or may be relayed through one or more wireless relay stations configured to receive and retransmit wireless communications. Communication links established by the communication system 120 may be configured to transmit data between elements of the survey system 100 substantially continuously throughout operation of the survey system 100, where such data includes various types of sensor data, control parameters, and/or other data.

The gimbal system 122 may be implemented as an actuated gimbal mount, for example, that may be controlled by the logic device 112 to stabilize the sensor payload 140 relative to a target (e.g., a target object or location) or to aim the sensor payload 140 or components coupled thereto according to a desired direction and/or relative orientation or position. As such, the gimbal system 122 may be configured to provide a relative orientation of the sensor payload 140 (e.g., relative to an orientation of the UAV 110) to the logic device 112 and/or communication system 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140±90 degrees, or up to 360 degrees, in a vertical plane relative to an orientation and/or position of the UAV 110. In further embodiments, the gimbal system 122 may rotate the sensor payload 140 to be parallel to a longitudinal axis or a lateral axis of the UAV 110 as the UAV 110 yaws, which may provide 360 degree ranging and/or imaging in a horizontal plane relative to UAV 110. In various embodiments, logic device 112 may be configured to monitor an orientation of gimbal system 122 and/or sensor payload 140 relative to UAV 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the UAV 110 and/or to steer the UAV 110. In some embodiments, the propulsion system 124 may include multiple propellers (e.g., a tri, quad, hex, oct, or other type "copter") that can be controlled (e.g., by the logic device 112 and/or the logic device 138) to provide lift and motion for the UAV 110 and to provide an orientation for UAV 110. In other embodiments, the propulsion system 124 may be configured primarily to provide thrust while other structures of the UAV 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Accessory port system 128 (also referred to as a payload port system) may include one or more payload ports. In some embodiments, the payload port(s) may be disposed on a main structure (e.g., body, frame) of the UAV 110. For example, the payload ports may be disposed on the UAV 110 so as to not interfere with a main payload (e.g., sensor payload 140 providing an imaging system). A plurality of interchangeable payload devices may be connected to the payload ports to provide additional functionality/capabilities to the UAV as described herein. For example, each of the interchangeable payload devices may have a port interface attached thereto that allows it to connect to one or more of the payload ports. The accessory port system 128 may operate independently from a main payload system such as sensor payload 140 so that attaching payload devices to the accessory port system 128 does not require a reconfiguration or interference in operation of the main payload. In some embodiments, the accessory port system 128 may be electrically coupled to the logic device 112 (and other elements of the UAV 110) to perform one or more operations as described herein.

Other modules 126 may include other and/or additional sensors, actuators, communications modules/nodes, and/or user interface devices, for example, and may be used to provide additional environmental information related to operation of the UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the survey system 100 (e.g., logic device 112) to provide operational control of the UAV 110 and/or the survey system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the UAV 110, where each actuated device includes one or more actuators adapted to adjust an orientation of the device, relative to the UAV 110, in response to one or more control signals (e.g., provided by the logic device 112). In particular, other modules 126 may include a stereo vision system configured to provide image data that may be used to calculate or estimate a position of the UAV 110, for example, or to calculate or estimate a relative position of a navigational hazard in proximity to the UAV 110. In various embodiments, the logic device 112 may be configured to use such proximity and/or position information to help safely pilot the UAV 110 and/or monitor communication link quality, as described herein.

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communication system 134 of the base station 130) to other devices of the survey system 100, such as the logic device 112. The user interface 132 may also be implemented with logic device 138 (e.g. similar to logic device 112), which may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, payload device control, and/or other information), for example, or to perform various other processes and/or methods described herein (e.g., via logic device 138 and communication system 134).

In one embodiment, the user interface 132 may be adapted to display a time series of various sensor information and/or other parameters as part of or overlaid on a graph or map, which may be referenced to a position and/or orientation of the UAV 110 and/or other elements of the survey system 100. For example, the user interface 132 may be adapted to display a time series of positions, headings, and/or orientations of the UAV 110 and/or other elements of the survey system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the survey system 100, for example, and to generate control signals to cause the UAV 110 to move according to the target heading, route, and/or orientation, or to aim the sensor payload 140 accordingly. In other embodiments, the user interface 132 may be adapted to accept user input modifying a control loop parameter of the logic device 112, for example. In further embodiments, the user interface 132 may be adapted to accept user input including a user-defined target altitude, orientation, and/or position for an actuated or articulated device (e.g., the sensor payload 140) associated with the UAV 110, for example, and to generate control signals for adjusting an orientation and/or position of the actuated device according to the target altitude, orientation, and/or position. Such control signals may be transmitted to the logic device 112 (e.g., using the communication system 134 and 120), which may then control the UAV 110 accordingly.

The communication system 134 may be implemented as any wired and/or wireless communications module configured to transmit and receive analog and/or digital signals between elements of the survey system 100. For example, the communication system 134 may be configured to transmit flight control signals from the user interface 132 to communication system 120 or 144 or accessory port system 128 or attached payload devices capable of communication. In other embodiments, the communication system 134 may be configured to receive sensor data (e.g., visible spectrum and/or infrared still images or video images, or other sensor data) from the sensor payload 140. In some embodiments, the communication system 134 may be configured to support spread spectrum transmissions, for example, and/or multiple simultaneous communications channels between elements of the survey system 100. In various embodiments, the communication system 134 may be configured to monitor the status of a communication link established between the base station 130, the sensor payload 140, and/or the UAV 110 (e.g., including packet loss of transmitted and received data between elements of the survey system 100, such as with digital communication links), as described herein. Such status information may be provided to the user interface 132, for example, or transmitted to other elements of the survey system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the survey system 100 (e.g., logic device 112) to provide operational control of the UAV 110 and/or survey system 100 or to process sensor data to compensate for environmental conditions, such as an water content in the atmosphere approximately at the same altitude and/or within the same area as the UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the sensor payload 140 is implemented as an imaging system, the sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the logic device 112) that can be configured to process imagery captured by detector elements of the imaging module 142 before providing the imagery to memory 146 or the communication system 144. More generally, the imaging module 142 may be configured to perform any of the operations or methods described herein, at least in part, or in combination with the logic device 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 144 of the sensor payload 140 may be implemented as any wired and/or wireless communications module configured to transmit and receive analog and/or digital signals between elements of the survey system 100. For example, the communication system 144 may be configured to transmit infrared images from the imaging module 142 to communication system 120 or 134. In other embodiments, the communication system 144 may be configured to receive control signals (e.g., control signals directing capture, focus, selective filtering, and/or other operation of sensor payload 140) from the logic device 112 and/or user interface 132. In some embodiments, communication system 144 may be configured to support spread spectrum transmissions, for example, and/or multiple simultaneous communications channels between elements of the survey system 100. In various embodiments, the communication system 144 may be configured to monitor and communicate the status of an orientation of the sensor payload 140 as described herein. Such status information may be provided or transmitted to other elements of the survey system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the survey system 100, for example, and provide it to various elements of the survey system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the UAV 110) and providing such measurements as sensor signals that may be communicated to various devices of the survey system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the survey system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the survey system 100 (e.g., logic device 112) to provide operational control of the UAV 110 and/or survey system 100 or to process imagery to compensate for environmental conditions.

In general, each of the elements of the survey system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the survey system 100. In addition, one or more non-transitory mediums may be provided for storing machine readable instructions for loading into and execution by any logic device implemented with one or more of the devices of the survey system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the survey system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the survey system 100 may include one or more modules supporting wired, wireless, and/or a combination of wired and wireless communication techniques. In some embodiments, various elements or portions of elements of the survey system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the survey system 100 may include one or more batteries, capacitors, or other electrical power storage devices, for example, and may include one or more solar cell modules or other electrical power generating devices. In some embodiments, one or more of the devices may be powered by a power source for the UAV 110, using one or more power leads. Such power leads may also be used to support one or more communication techniques between elements of the survey system 100.

Figure 2:
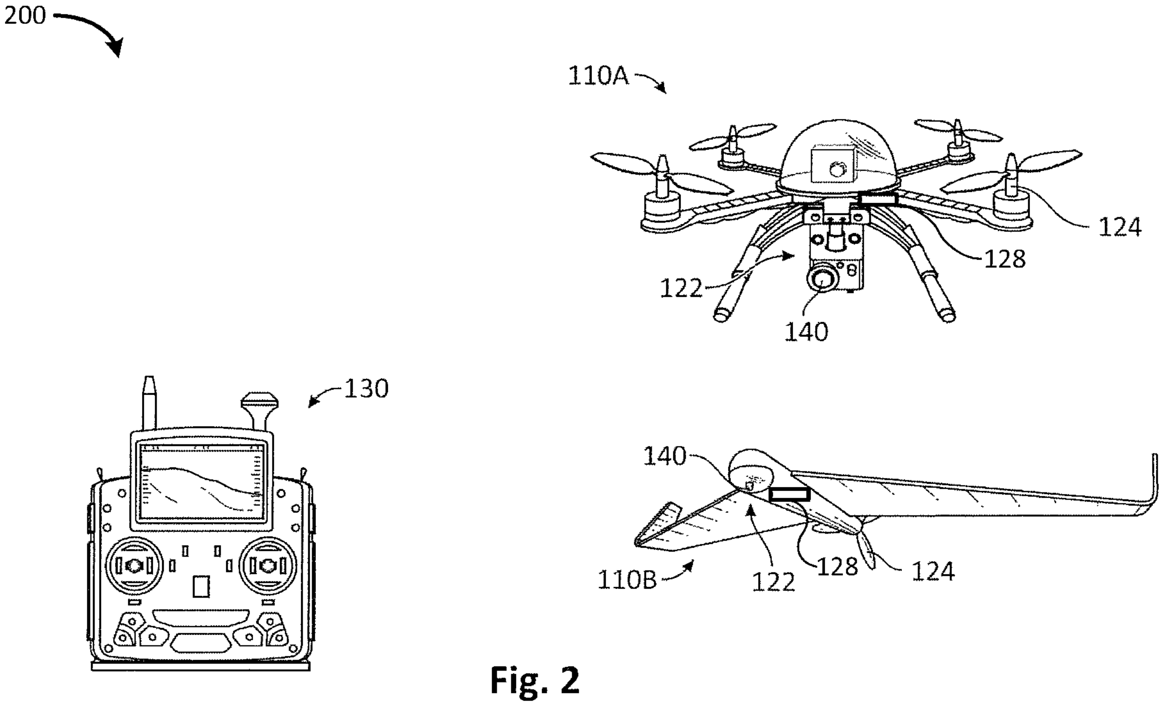
FIG. 2 is a diagram of a survey system in accordance with one or more embodiments of the present disclosure.

FIG. 2 illustrates a survey system 200 including UAVs 110A and 110B, each with sensor payloads 140 and associated gimbal systems 122 in accordance with one or more embodiments of the present disclosure. In the embodiment shown in FIG. 2, the survey system 200 includes a base station 130, UAV 110A with articulated sensor payload 140 and gimbal system 122, and UAV 110B with articulated sensor payload 140 and gimbal system 122, where the base station 130 may be configured to control motion, position, and/or orientation of the UAV 110A, UAV 110B, and/or sensor payloads 140. More generally, the survey system 200 may include any number of the UAVs 110, 110A, and/or 110B.

FIGS. 3-13 illustrate various features of some embodiments of electromechanical platform-payload interface systems 304 that may implement payload ports of accessory port system 128 or other ports. Platform-payload interface system 304 connects and latches a payload 306 to platform 110. Payload 306 may include gimbal system 122 and sensor payload 140 as discussed above, or may be some other payload device connected to payload ports of accessory port system 128. Platform 110 can be a UAV, a UGV, a fixed emplacement, a handheld unit, or some other type.

In various embodiments, platform-payload interface system 304 can be used as a universal interface for different types of payloads 306, possibly provided by different manufacturers. Platform-payload interface system 304 can be retrofitted to existing platforms 110 via adapters, not shown, while future platforms 110 may have platform-payload interface system 304 natively integrated with the platform. Some embodiments of platform-payload interface system 304 utilize a standard Universal Serial Bus (USB) USB-C connector 310, which includes a female connector 310F and a male connector 310M, for the power and communications interface (USB 2.1 "high speed" [480 mbps throughput], 100 watts power with negotiation, host/client negotiation, Ethernet over USB). However, other electrical interfaces or network protocols can also be used.

In some embodiments, the mechanical latching interface of platform-payload interface system 304 is designed to be usable with one hand by simply pushing the payload 306 toward platform 110 and turning the payload by 45 degrees (⅛ turn), or some other predefined angle, with respect to the platform. The invention is not limited to the one-hand operation capability, however.

Platform-payload interface system 304 includes platform interface 320 and payload interface 330. Platform interface 320 may implement an accessory port in accessory port system 128 (FIGS. 1, 2). Platform interface 320 includes male UAB connector 310M. Payload interface 330 includes female USB connector 310F. The male and female connectors can be interchanged, and multiple USB and/or one or more non-USB connectors can be used in the same platform-payload interface system 304.

Platform interface 320 and payload interface 330 are keyed (using, for example, slots 510, 520 and tabs 510T, 520T described below) such that they only connect in one orientation in which the male and female connectors 310M, 310F are properly aligned before coming into contact. Other embodiments provide for more than one orientation for connection. For example, for USB-C connectors, the keying of platform interface 320 and payload interface 330 may provide for two orientations at 180 degrees from each other.

Connecting or disconnecting the platform interface 320 and payload interface 330 is accomplished by pressing the two together and rotating with respect to one another by 45 degrees (⅛ turn), or some other predefined angle in some embodiments, clockwise to engage and counterclockwise to disengage (or vice versa in some embodiments). As used herein, the terms "clockwise" and "counterclockwise" assume that the platform-payload interface system is viewed from the payload side, i.e. from the top of FIGS. 3 and 4. The "clockwise" and "counterclockwise" directions of rotation are reversed in some embodiments.

Figure 3:
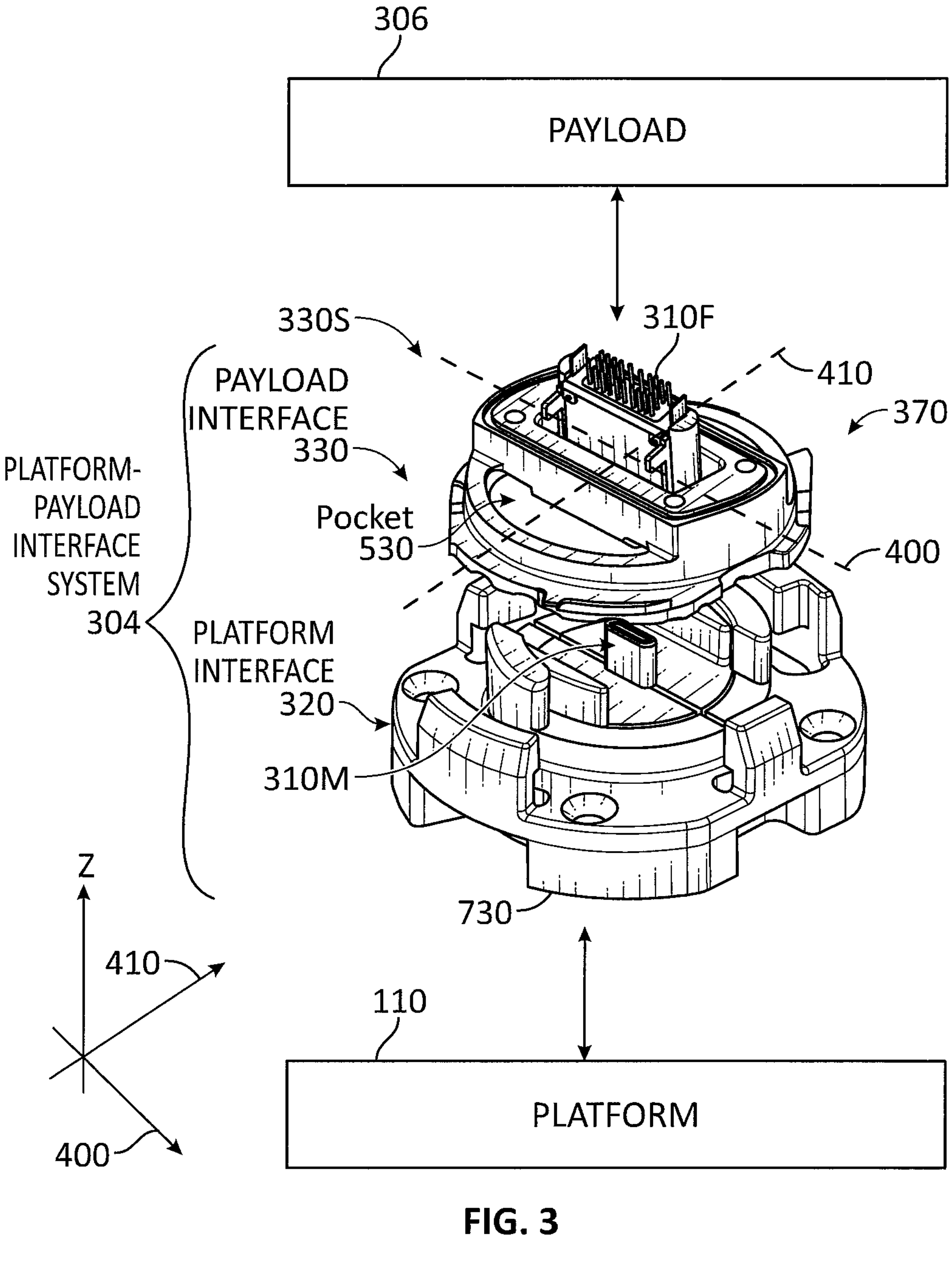
FIG. 3 is an exploded top perspective view of a platform-payload interface system with the payload interface being aligned with, but spaced from, the platform interface in accordance with one or more embodiments of the present disclosure.
Figure 4:
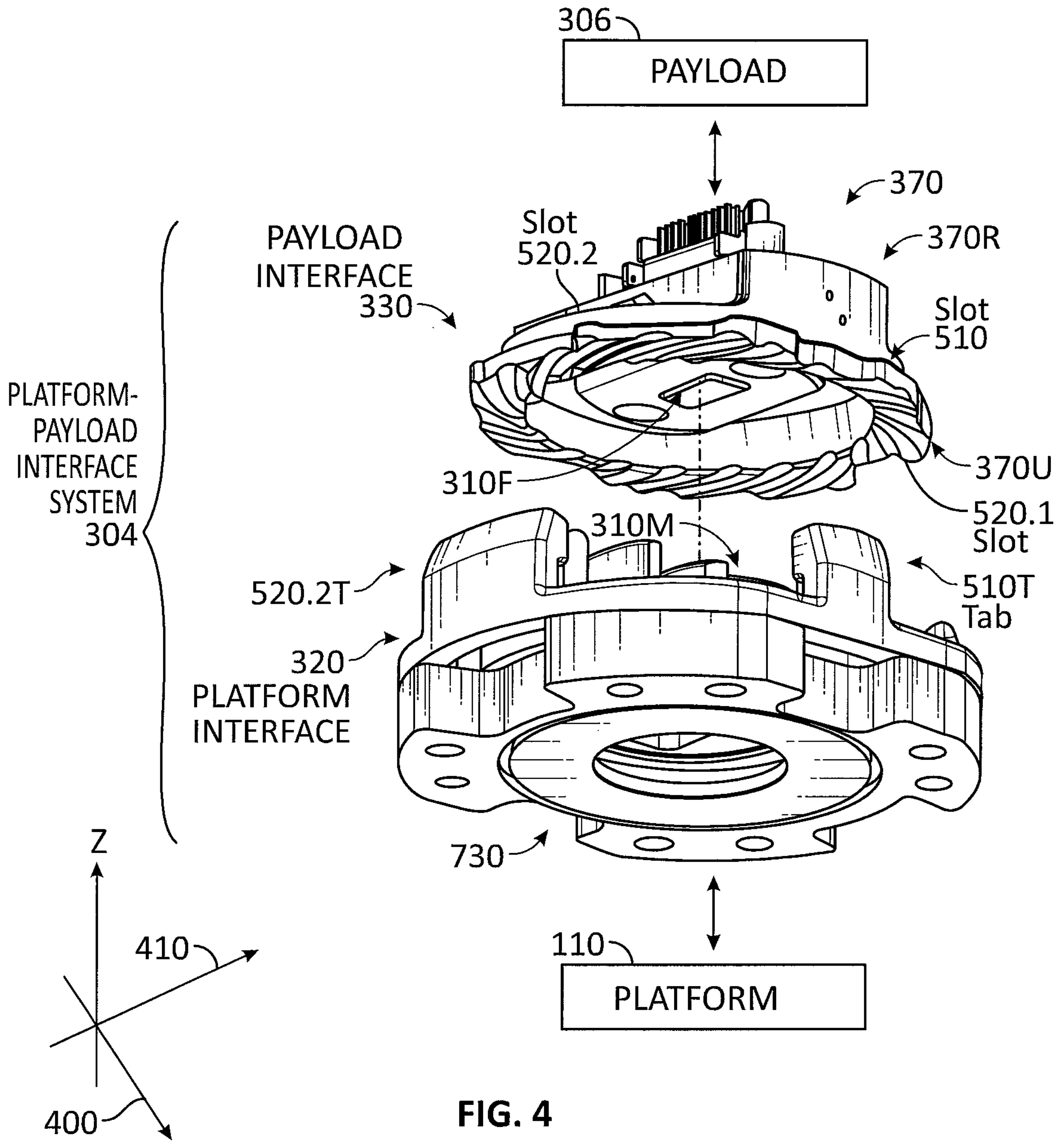
FIG. 4 is an exploded bottom perspective view of a platform-payload interface system with the payload interface being aligned with, but spaced from, the platform interface in accordance with one or more embodiments of the present disclosure.
Figure 5:
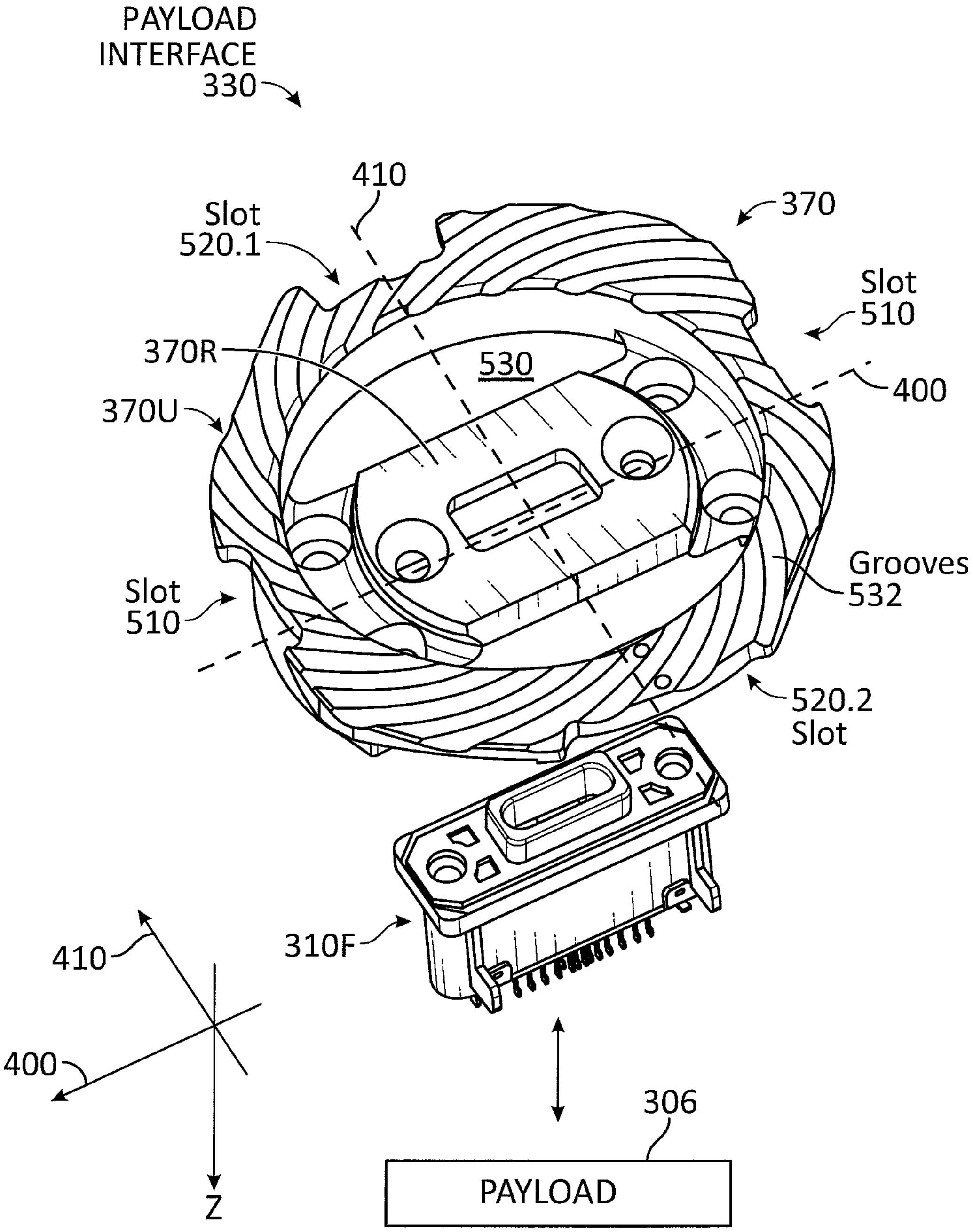
FIG. 5 is an exploded bottom perspective view of the payload interface of a platform-payload interface system in accordance with one or more embodiments of the present disclosure.

FIGS. 3 and 4 show the payload interface 330 above platform interface 320, and this orientation will be assumed herein when using the terms such "top" and "bottom" or "upper" and "lower". However, platform-payload interface system 304 can be used in any orientation unless specified otherwise.

Platform interface 320 includes base 730 attached to platform 110 or integrated with the platform. Payload interface 330 includes support 370 serving as a mechanical interface. Support 370 is attached to payload 306 or integrated with the payload. Platform interface 320 includes wiring that electrically connects male connector 310M to the platform. Payload interface 330 includes wiring that electrically connects female connector 310F to the payload.

Figure 6:
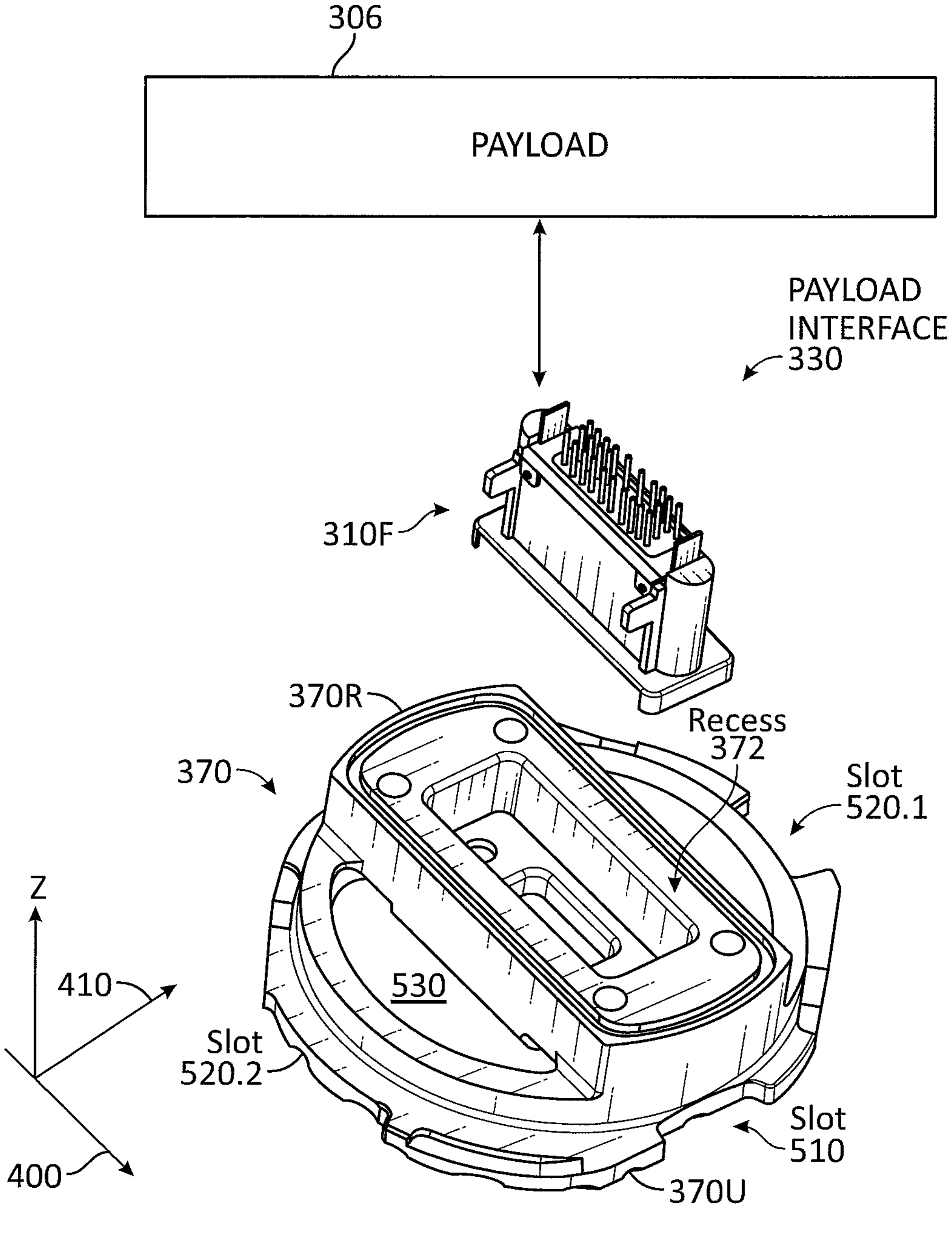
FIG. 6 is an exploded top perspective view of the payload interface of a platform-payload interface system in accordance with one or more embodiments of the present disclosure.
Figure 7:
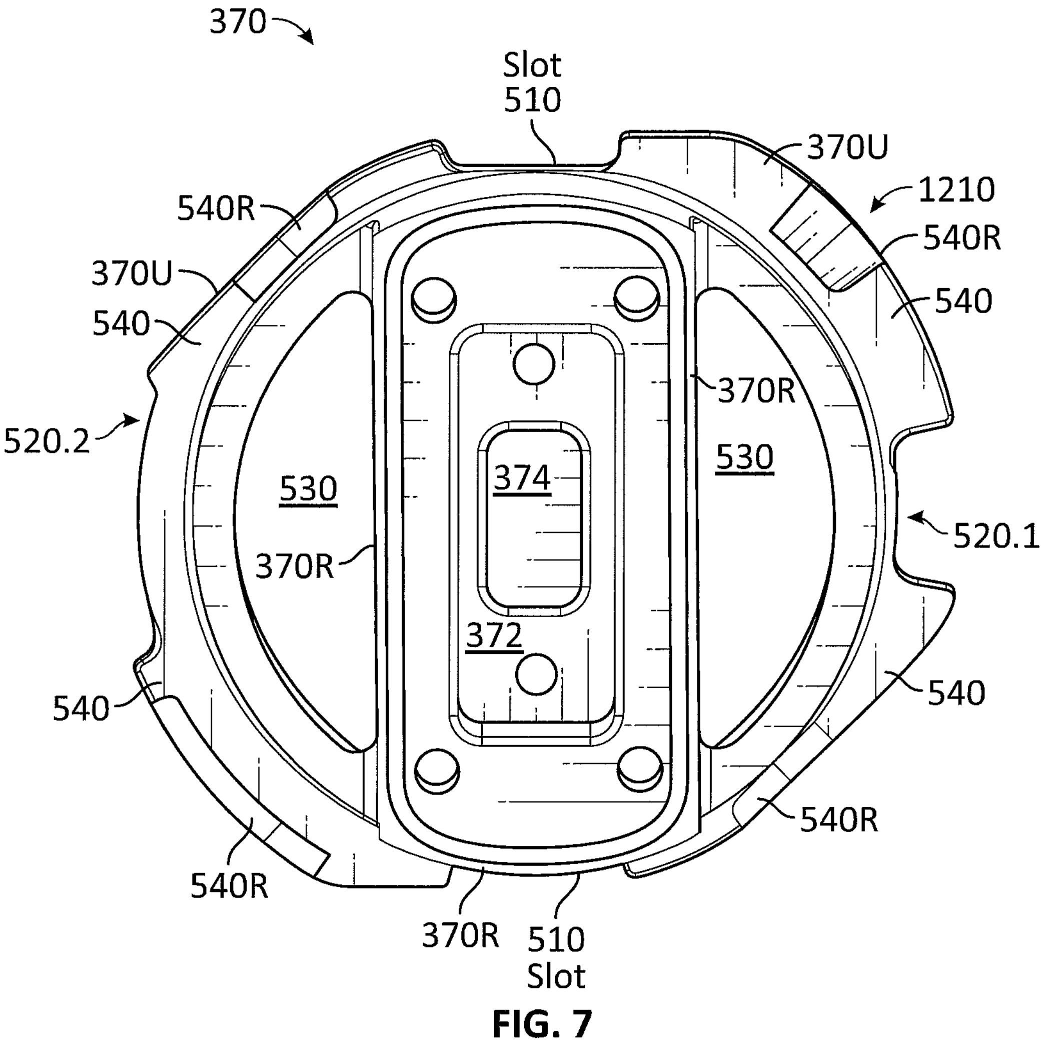
FIG. 7 is a top view of the support of the payload interface of a platform-payload interface system in accordance with one or more embodiments of the present disclosure.

Payload interface 330 (FIGS. 3-9) includes two functional components: support 370 and female connector 310F (plus fasteners, e.g. threaded fasteners, not shown, and possibly other components). Support 370 may be formed by machining, molding, atomic layer deposition, or some other technique. As seen in FIGS. 6 and 7, support 370 includes a ring-like lower section 370U and a raised section including a raised center portion 370R extending over and across the lower section 370U. Lower section 370U and raised center portion 370R define half-circular open pockets 530 (FIG. 7) passing through lower section 370U on both sides of raised center portion 370R. Pockets 530 mate with platform interface 320 to provide limit stops for the rotation when installing or removing the payload 306 as explained below.

Female connector 310F is lowered into a central recess 372 provided at the top of raised center portion 370R, and is affixed to raised center portion 370R. Female connector 310F can connect with the platform's male connector 310M via through-hole slot 374 (FIG. 7) at the bottom of central recess 372.

The periphery of lower section 370U has two equal sized alignment slots 510 (FIGS. 5-7) in line with long horizontal axis 400 of USB-C connector 310, and two dissimilar alignment slots 520.1, 520.2 on the other horizontal axis 410 perpendicular to axis 400. Alignment slot 520.1 has a greater radial depth than alignment slot 520.2, and alignment slot 520.1 is circumferentially shorter than alignment slot 520.2. Other combinations of alignment slots and slot sizes can also be used. Alignment slots 510, 520 (520.1, 520.2) are size-matched with respective tabs 510T, 520.1T, 520.2T of platform mounting interface 710 (FIGS. 9-12A) of platform interface 320 to ensure correct alignment between platform interface 320 and payload interface 330 before the connectors 310M, 310F are connected together: during installation, tabs 510T, 520T (520.1T, 520.2T) enter the respective alignment slots 510, 520 to fix the rotational orientation of payload interface 330 relative to platform interface 320 before the connectors 310M, 310F are connected together.

Grooves 532 (FIG. 5) in the bottom surface of lower section 370U give both aesthetic appeal and functionality in giving space for debris so as to not impede the ability of payload interface 330 and platform interface 320 to be joined together during installation.

Figure 8:
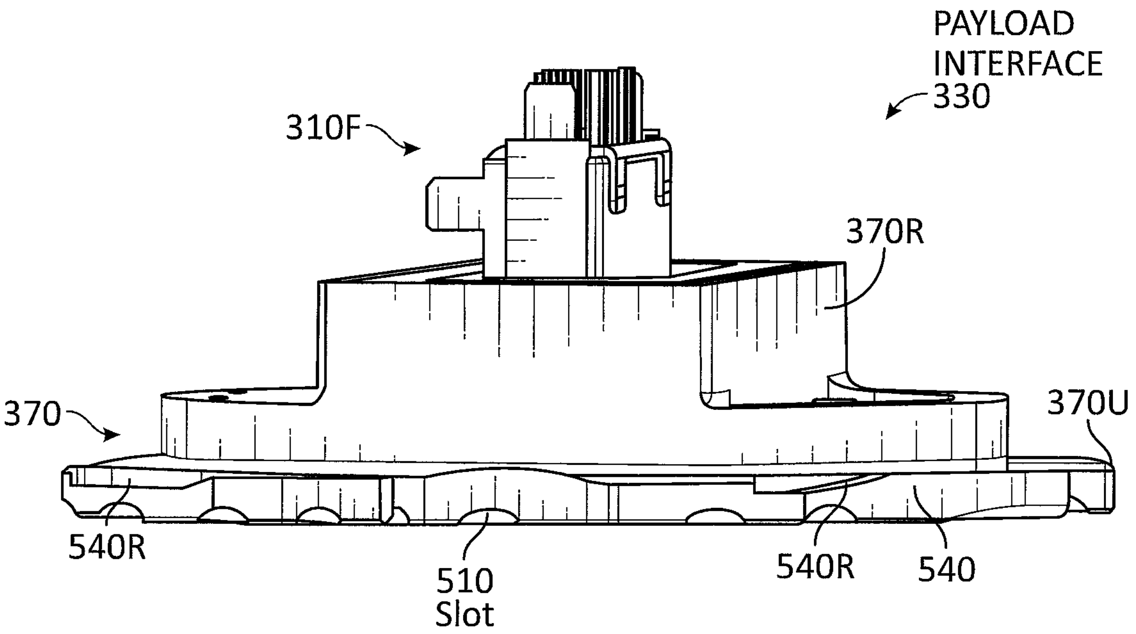
FIG. 8 is a side perspective view of the payload interface of a platform-payload interface system in accordance with one or more embodiments of the present disclosure.
Figure 9:
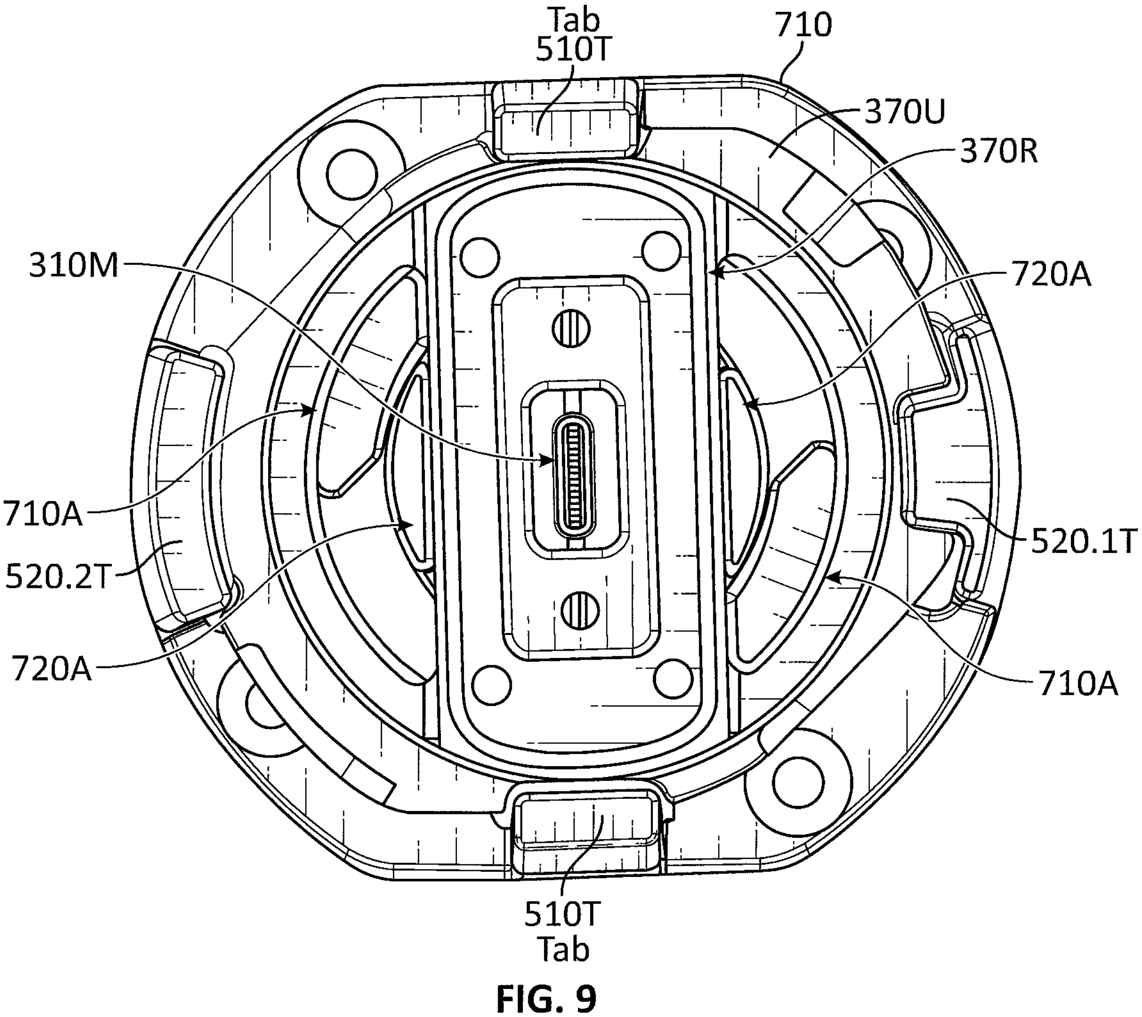
FIG. 9 is a top view of the support of the payload interface joined with the platform interface in a platform-payload interface system in accordance with one or more embodiments of the present disclosure.
Figure 10:
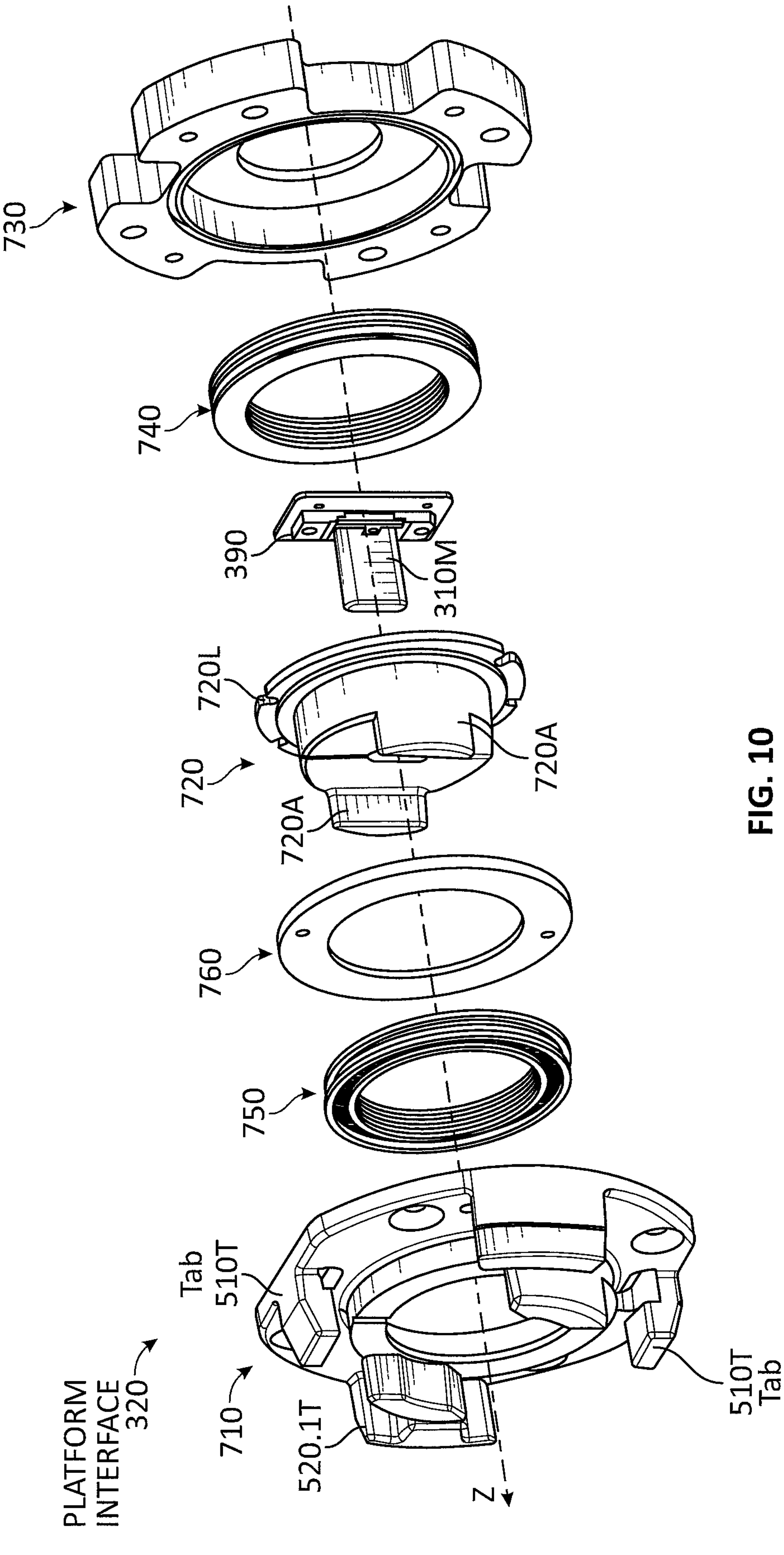
FIG. 10 is an exploded perspective shaded view of the platform interface of a platform-payload interface system in accordance with one or more embodiments of the present disclosure.
Figure 11:
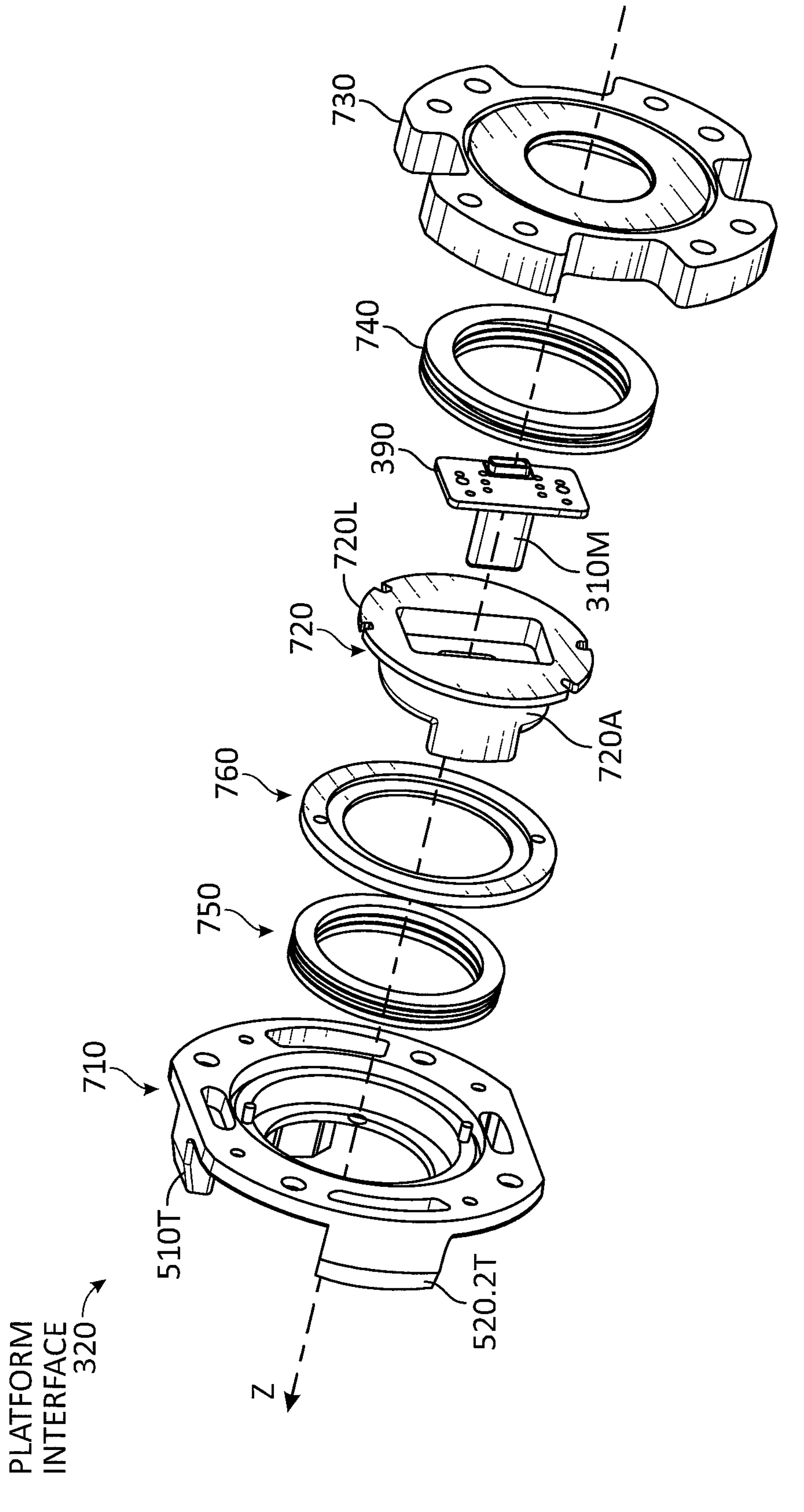
FIG. 11 is an exploded perspective wireline view of the platform interface of a platform-payload interface system in accordance with one or more embodiments of the present disclosure.
Figure 12A:
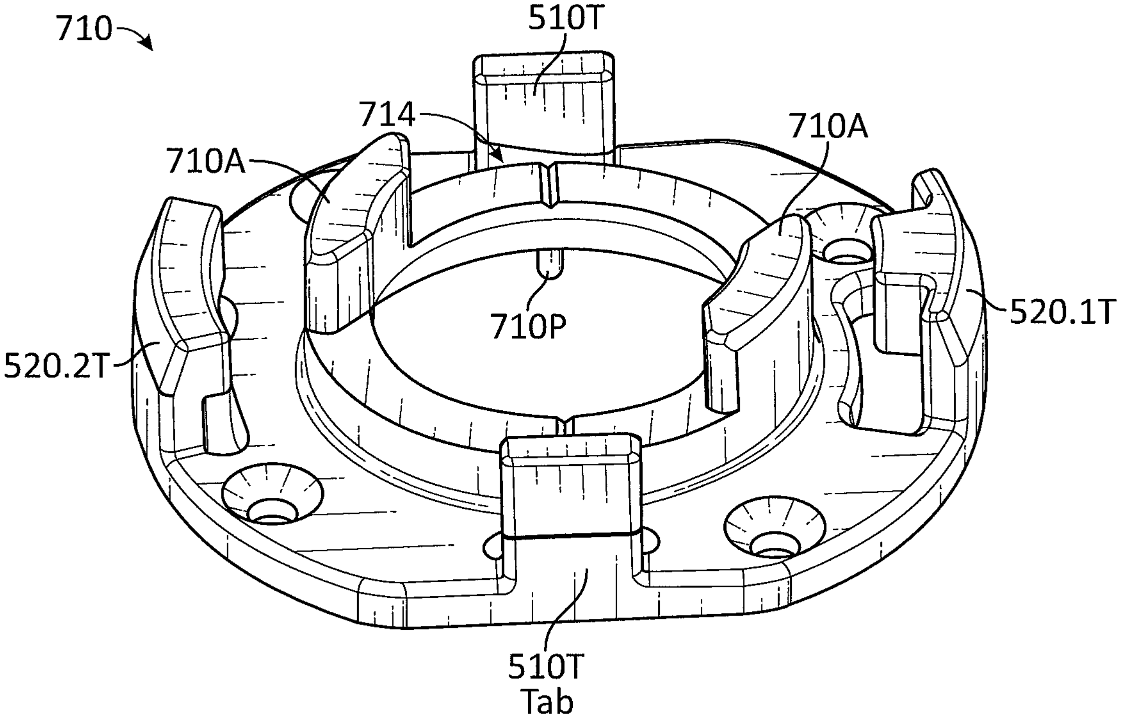
FIG. 12A is a top perspective wireline view of a platform interface mounting interface in accordance with one or more embodiments of the present disclosure.
Figure 12B:
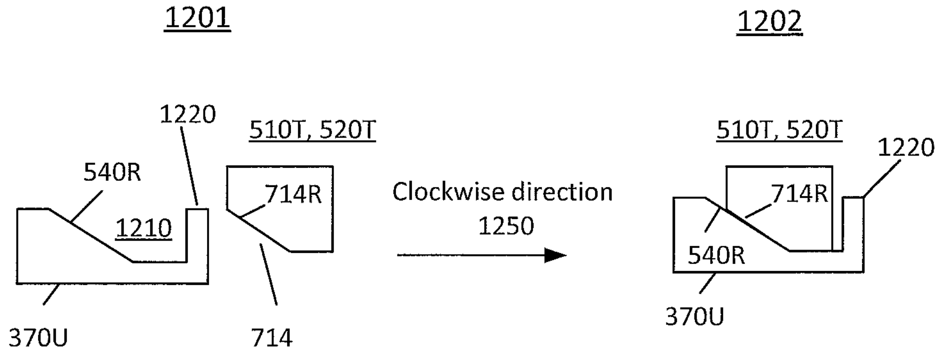
FIG. 12B is a schematic side view from inside the platform-payload interface system in accordance with one or more embodiments of the present disclosure.
Figure 13:
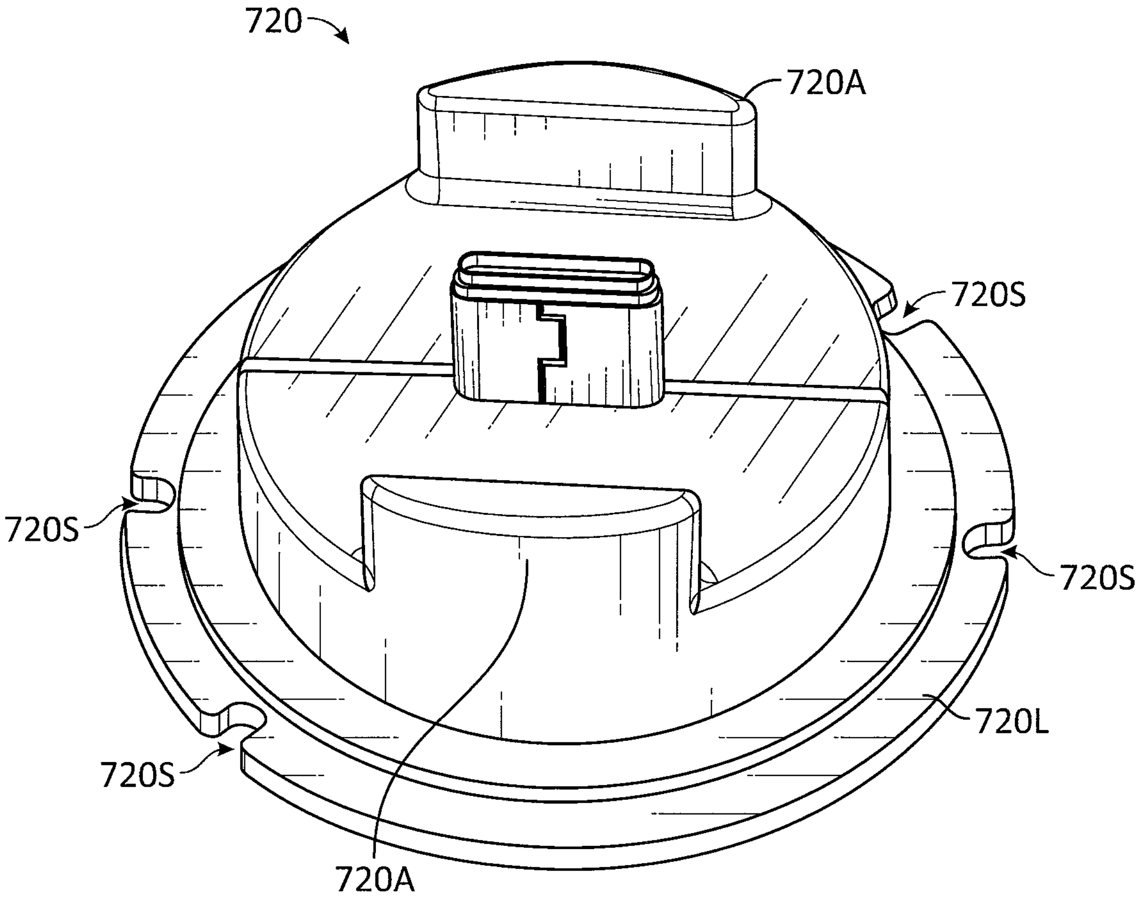
FIG. 13 is a top perspective wireline view of a center section of the platform interface of a platform-payload interface system in accordance with one or more embodiments of the present disclosure.

Lower section 370U has four detents 540 (FIGS. 7, 8). Each detent 540 is a radial protrusion between two respective adjacent alignment slots 510, 520. The top surface of each detent 540 includes a pocket 1210 (FIG. 7, 12B) which includes a ramp 540R. FIG. 12B is a schematic side view from inside of platform interface 320 and payload interface 330, showing mutual position of a detent 540 and a corresponding tab 510T or 520T before rotation during installation (at 1201) and after the rotation in the locked position (at 1202). In this example, payload interface 330 is rotated clockwise (direction 1250) into the latched position 1202. Ramp 540R is at the counterclockwise side of pocket 1210, i.e. at the pocket trailing edge in the clockwise rotation. Ramp 540R is inclined down towards the corresponding tab 510T or 520T. Each detent 540 is positioned 45 degrees counterclockwise from the corresponding alignment slot 510 or 520. During installation, when payload interface 330 rotates clockwise, the leading edge (sidewall protrusion) 1220 of each pocket 1210 enters a recess 714 (FIGS. 12A, 12B) at the bottom of corresponding tab 510T or 520T. The top surface of recess 714 includes a ramp 714R at the counterclockwise side. Ramp 714R matches the corresponding ramp 540R: both ramps are inclined downward in the clockwise direction, at about the same inclination angle. As the leading edge 1220 passes under the ramp 714R, the ramp 714R causes the payload interface 330 to be pulled down toward platform interface 320. When the leading edge 1220 emerges from recess 714 past the corresponding tab 510T or 520T (as shown at 1202), the tab's portion over the recess 714 snaps into the pocket 1210 (due to the action of wave spring 740 shown in FIGS. 10-11 and described below) to latch the payload interface 330 into place. The ramps 540R, 714R come together to impede further rotation.

Platform interface 320 (FIGS. 10, 11) has several functional components, including machined parts such as base 730, connector holder 720, and platform mounting interface 710 (machining can be replaced with other manufacturing methods, e.g. molding or atomic layer deposition). The functional components also include an electronics board 390 with male connector 310M, threaded fasteners (not shown), a stacked wave spring 740, and a rotary seal 750 (e.g. of the kind available from Bal Seal Engineering having offices in the United States of America).

In some embodiments, base 730 and platform mounting interface 710 are joined together to define a cavity containing other functional components 310M, 390, 740, 750, 760, etc. This cavity may be closed except for openings in base 730 and platform mounting interface 710 that are used for wires connecting the connector 310 to payload 306 and platform 110.

PCB 390 is permanently affixed to the bottom of connector holder 720 by screws or other fasteners (not shown) or other means. Male connector 310M is attached to PCB 390 and passes through central holes in connector holder 720, retainer 760, rotary seal 750, and platform mounting interface 710 to connect to female connector 310F. Male connector 310M, PCB 390, and connector holder 720 form a rigid assembly rotating in rotary seal 750 relative to base 730, platform mounting interface 710, retainer 760, and spring 740 about the central axis parallel to the Z axis. Rotary seal 750 has a stationary part affixed to platform mounting interface 710 and ring-shaped retainer 760, and a rotating part affixed to connector holder 720. Connector holder 720 passes through retainer 760 and rotary seal 750 to engage with payload interface 330.

Specifically, connector holder 720 has two raised arms 720A on the outside that enter the pockets 530 in support 370 to provide the lever arm to rotate the rigid assembly 720/310/390 in response to torque applied to payload interface 330 while not transferring torque directly to USB connector 310. When payload interface 330 has been pushed into platform interface 320 during payload installation, the entire payload interface 330, connector 310, PCB 390, and connector holder 720 can be rotated together into the latched position.

Ring-shaped lip 720L (FIG. 13) of connector holder 720 has four radial rotation-stopping slots 720S that are arranged in pairs of diametrically opposite rotation-stopping slots to limit the rotational travel of the assembly 720/310/390. The rotational travel is limited when the rotation-stopping slot pair holds two pins 710P that are downward protrusions of platform mounting interface 710. Pins 710P pass through holes in retainer 760 toward lip 720L. Pins 710P are held in rotation-stopping slots 720S by spring 740 pushing the connector holder 720 toward the platform mounting interface 710. When however the payload interface 330 is pushed down into platform interface 320, the pushing force overcomes the spring force to push the connector holder 720 away from pins 710P. The pins 710P become released from rotation-stopping slots 720S to enable rotation of payload interface 330 into or out of the latched position.

In the latched position 1202 (FIG. 12B), the spring force also keeps the tabs 510T, 520T in respective pockets 1210. During deinstallation, payload interface 330 is pushed down into platform interface 320, to release the tabs 510T, 520T out of pockets 1210 and enable counterclockwise rotation of payload interface 330.

The two pairs of rotation-stopping slots 720S are at 45 degrees from each other so that the rotation is blocked in two positions: the position when the payload interface 330 is latched to platform interface 320, and the position when the payload interface 330 is disengaged from platform interface 320. In the disengagement position, the rotation is blocked in order to fix male connector 310M relative to alignment tabs 510T/520T to facilitate platform/payload alignment for installation.

Bracketing the central rotating connector holder 720 are raised arms 710A at the top of payload mounting interface 710 that are used to locate the payload interface 330 as it is inserted. Arms 710A are the tallest section of platform interface 320. Arms 710A enter the pockets 530 and serve as hard stops that limit the rotation of payload interface 330 between the latched and unlatched positions.

Other parts can be used to hold everything together and do not have other special functional purpose. Threaded fasteners and o-ring seals not shown for clarity.

Embodiments described above illustrate but do not limit the invention. For example, as stated above, the connector 310 may be a non-USB connector. Further, pockets 530 and arms 720A can be omitted, and the torque can be transmitted from payload interface 330 to platform interface 320 through connector 310 or by some other means. If pockets 530 are used, they can be any in number, including possibly just one such pocket, and the pockets may vary in shape. Spring 740 may be a non-wave spring, and rotary seal 750 may be replaced by one or more non-sealing bearings. Other embodiments and variations are within the scope of the invention, as defined by the appended claims.

What is claimed is:

1. A system comprising:

a platform interface comprising:

a base configured to be secured to a platform or integrated with the platform, and configured to rotatably engage with a support of a payload interface to secure the payload interface to the platform interface, the support being configured to be secured to a payload; and a first electrical connector configured to engage with a second electrical connector affixed to the support, and to rotate with the second electrical connector relative to the base as the support is rotated to engage the base;

a spring configured to bias the first electrical connector toward the second electrical connector;

a connector holder supporting the first electrical connector and having one or more rotation-stopping slots configured to rotate with the first electrical connector;

one or more rotation locking elements configured to enter the one or more rotation-stopping slots to block rotation of the first electrical connector; and wherein the one or more rotation-stopping slots are configured to move away from the one or more rotation locking elements to allow the first electrical connector to rotate in response to the first electrical connector counteracting the spring bias.

2. The system of claim 1, wherein the platform interface comprises one or more first recesses configured to receive one or more detents of the support to engage the support with the base.

3. The system of claim 2, wherein the platform interface comprises a platform mounting interface affixed to the base and comprising the one or more first recesses.

4. The system of claim 2, wherein:

the platform interface comprises one or more tabs sized to enter respective one or more alignment slots in the support to align the payload interface with the platform interface; and the one or more first recesses are recesses in the one or more tabs.

5. The system of claim 4, further comprising:

the payload interface; and wherein at least one detent of the one or more detents comprises a pocket such that rotating the support to engage with the base causes a corresponding tab of the one or more tabs to be latched in the pocket and be secured in the pocket by the spring.

6. The system of claim 1, wherein the connector holder comprises one or more arms configured to enter one or more pockets of the support to serve as one or more lever arms rotating the connector holder in response to rotation of the support.

7. The system of claim 1, wherein the platform interface comprises one or more arms fixed relative to the base and configured to enter one or more pockets of the support to limit rotation of the support.

8. The system of claim 1, further comprising the platform, wherein the platform is an unmanned aerial vehicle (UAV).

9. A method comprising:

connecting a payload interface to a platform interface comprising a platform mounting interface configured to be secured to a platform, the platform mounting interface comprising a spring biasing a first electrical connector toward a second electrical connector and one or more tabs, the connecting comprising:

aligning the payload interface relative to the platform interface to engage the first electrical connector of the platform interface with the second electrical connector affixed to a support of the payload interface, the support being configured to be secured to the payload and comprising one or more detents; and rotating the support with the first and second electrical connectors relative to the platform mounting interface to engage the support with the platform mounting interface, wherein at least one detent of the one or more detents comprises a pocket such that rotating the support causes a corresponding tab of the one or more tabs to be latched in the pocket and be secured in the pocket by the spring.

10. The method of claim 9, wherein the platform interface comprises one or more first recesses receiving the one or more detents of the support to engage the support with the platform mounting interface.

11. The method of claim 10, wherein the one or more first recesses are recesses in the platform mounting interface.

12. The method of claim 11, wherein:

the platform mounting interface comprises the one or more tabs entering respective one or more alignment slots in the support to align the payload interface with the platform interface; and the one or more first recesses are recesses in the one or more tabs.

13. The method of claim 9, wherein:

the platform interface comprises:

one or more rotation-stopping slots configured to rotate with the first electrical connector, and one or more rotation locking elements configured to enter the one or more rotation-stopping slots to block rotation of the first electrical connector; and the one or more rotation-stopping slots move away from the one or more rotation locking elements to allow the first electrical connector to rotate in response to the first electrical connector counteracting the spring bias.

14. The method of claim 13, wherein the platform interface further comprises a connector holder supporting the first electrical connector and having the one or more rotation-stopping slots.

15. The method of claim 14, wherein the connector holder comprises one or more arms entering one or more pockets of the support to serve as one or more lever arms rotating the connector holder in response to rotation of the support.

16. The method of claim 14, wherein the platform mounting interface comprises one or more arms entering one or more pockets of the support to limit rotation of the support.

17. A system comprising:

a payload interface comprising a support configured to be secured to a payload, the support comprising one or more detents;

a platform interface comprising:

a base configured to be secured to a platform or integrated with the platform, and configured to rotatably engage with the support of the payload interface to secure the payload interface to the platform interface;

a first electrical connector configured to engage with a second electrical connector affixed to the support, and to rotate with the second electrical connector relative to the base as the support is rotated to engage the base;

a spring configured to bias the first electrical connector toward the second electrical connector; and one or more tabs; and wherein at least one detent of the one or more detents comprises a pocket such that rotating the support to engage with the base causes a corresponding tab of the one or more tabs to be latched in the pocket and be secured in the pocket by the spring.

18. The system of claim 17, wherein the platform interface comprises:

a connector holder supporting the first electrical connector and having one or more rotation-stopping slots configured to rotate with the first electrical connector, and one or more rotation locking elements configured to enter the one or more rotation-stopping slots to block rotation of the first electrical connector;

wherein the one or more rotation-stopping slots are configured to move away from the one or more rotation locking elements to allow the first electrical connector to rotate in response to the first electrical connector counteracting the spring bias.

19. The system of claim 18, wherein the connector holder comprises one or more arms configured to enter one or more pockets of the support to serve as one or more lever arms rotating the connector holder in response to rotation of the support.

20. The system of claim 18, wherein the platform interface comprises one or more arms fixed relative to the base and configured to enter one or more pockets of the support to limit rotation of the support.

* * * * *